United States Patent
Jeon et al.

(10) Patent No.: US 11,664,652 B2
(45) Date of Patent: May 30, 2023

(54) EMERGENCY POWER MANAGEMENT SYSTEM OF MOBILITY AND CONTROL METHOD THEREOF

(71) Applicants: Hyundai Motor Company, Seoul (KR); Kia Corporation, Seoul (KR)

(72) Inventors: Yoon Cheol Jeon, Suwon-si (KR); Hyun Woo Jun, Seoul (KR); Hee Kwang Lee, Suwon-si (KR); Hyun Ki Cho, Anyang-si (KR); Gwi Taek Kim, Cheonan-si (KR); Hyun Seok Hong, Seoul (KR); Woo Suk Jung, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 179 days.

(21) Appl. No.: 17/389,585

(22) Filed: Jul. 30, 2021

(65) Prior Publication Data
US 2022/0200265 A1  Jun. 23, 2022

(30) Foreign Application Priority Data
Dec. 22, 2020 (KR) .......... 10-2020-0181246

(51) Int. Cl.
*H02H 3/20* (2006.01)
*H02H 1/00* (2006.01)
(Continued)

(52) U.S. Cl.
CPC ............ *H02H 3/20* (2013.01); *B60L 3/0046* (2013.01); *B60L 50/60* (2019.02); *B64D 27/24* (2013.01);
(Continued)

(58) Field of Classification Search
CPC .... B60K 2028/006; B60K 28/14; B60K 6/28; B60L 2200/10; B60L 2200/24;
(Continued)

(56) References Cited

U.S. PATENT DOCUMENTS 5,818,122 A * 10/1998 Miyazawa ............. B60K 28/14
340/436
11,355,300 B2 * 6/2022 Urrea ................. H01H 85/0241
(Continued)

FOREIGN PATENT DOCUMENTS

KR  10-2020-0042238 A  4/2020

OTHER PUBLICATIONS

P. Lell "Innovative Safety Concept to Shutdown Short Circuit Currents in Battery Systems up to 1000V Based on Ultrafast Pyrofuse Technology," 2018 IEEE Holm Conference on Electrical Contacts, Albuquerque, NM, USA, 2018, pp. 317-322. < https://ieeexplore.ieee.org/stamp/stamp.jsp?tp=&arnumber=8611656> (Year: 2018).*

*Primary Examiner* — Jared Fureman
*Assistant Examiner* — Nicolas Bellido
(74) *Attorney, Agent, or Firm* — Morgan, Lewis & Bockius LLP

(57) ABSTRACT

An emergency power management system of a mobility, may include a fuse device connected to a battery and including a first circuit and a second circuit in which a first fuse and a second fuse are respectively provided and are connected in parallel, a pyro switch provided between the first circuit and the second circuit, and configured to establish electric connection with the first circuit in ordinary times and to release electric connection with the first circuit and to establish electric connection with the second circuit in a case of emergency, a determiner configured to determine abnormality of the first fuse based on current applied from
(Continued)

the high-voltage battery or voltages at opposite end portions of the first fuse, and a controller configured to operate the pyro switch when abnormality occurs in the first fuse.

14 Claims, 3 Drawing Sheets

(51) Int. Cl.
  *H01H 39/00* (2006.01)
  *B64D 27/24* (2006.01)
  *B60L 50/60* (2019.01)
  *B60L 3/00* (2019.01)
  *H01H 85/04* (2006.01)

(52) U.S. Cl.
  CPC ............ *H01H 39/00* (2013.01); *H01H 85/04* (2013.01); *H02H 1/0007* (2013.01); *B60L 2200/10* (2013.01)

(58) Field of Classification Search
  CPC .......... B60L 2240/547; B60L 2250/10; B60L 2270/20; B60L 3/0023; B60L 3/0046; B60L 3/0092; B60L 3/04; B60L 50/60; B60R 16/033; B60Y 2200/91; B64D 2221/00; B64D 27/24; B64D 45/00; G01R 19/16566; G01R 31/327; G01R 31/382; G01R 31/392; G01R 31/74; H01H 2039/008; H01H 39/00; H01H 39/002; H01H 85/04; H01H 85/143; H02H 1/0007; H02H 3/033; H02H 3/046; H02H 3/087; H02H 3/20; H02H 7/22; H02J 1/06; H02J 2310/48; H02J 7/00302; H02J 7/00304; H02J 7/0031; H02J 9/06; H02J 9/062; Y02E 60/10; Y02T 10/70
  See application file for complete search history.

(56) References Cited

U.S. PATENT DOCUMENTS

| | | | | |
|---|---|---|---|---|
| 11,387,061 | B2* | 7/2022 | Sullivan | H01H 39/00 |
| 2004/0041682 | A1* | 3/2004 | Pasha | H01H 39/006 |
| | | | | 337/401 |
| 2008/0137253 | A1* | 6/2008 | George | H01H 39/006 |
| | | | | 29/428 |
| 2012/0127621 | A1* | 5/2012 | Knapp, Jr. | H02H 7/20 |
| | | | | 361/94 |
| 2013/0175144 | A1* | 7/2013 | Sprenger | H01H 39/006 |
| | | | | 200/61.08 |
| 2019/0296541 | A1* | 9/2019 | Mensch | H01H 50/12 |
| 2020/0194996 | A1* | 6/2020 | Fisher | H05K 7/2089 |
| 2022/0115878 | A1* | 4/2022 | Khozikov | B60L 58/18 |

* cited by examiner

EMERGENCY POWER MANAGEMENT SYSTEM OF MOBILITY AND CONTROL METHOD THEREOF

CROSS-REFERENCE TO RELATED APPLICATION

The present application claims priority to Korean Patent Application No. 10-2020-0181246, filed on Dec. 22, 2020, the entire contents of which is incorporated herein for all purposes by this reference.

BACKGROUND OF THE INVENTION

Field of the Invention

The present invention relates to an emergency power management system of a mobility and a control method thereof, and more particularly to technology of continuously operating the mobility rather than stopping the mobility by installing a plurality of fuses and connecting a circuit to a sub-fuse when abnormality occurs in a main fuse.

Description of Related Art

In general, in mobility using electrical energy of a high-voltage battery, when a high-voltage battery is used and current repeatedly flows therein, even if the current is equal to or less than a threshold, a fuse applied to a high-voltage battery system is blown due to fatigue.

Conventionally, a driver is not capable of recognizing a progress of deterioration of a fuse of a battery system applied to mobility, and thus when the fuse is blown while a vehicle travels, battery power supplied to a motor is interrupted, and accordingly it is not possible to operate the motor and there is a problem in terms of safety.

Accordingly, there has been a demand for technology for monitoring a blown or deteriorated state of a fuse and achieving connection with a sub-fuse for assisting a main fuse when the main fuse is blown.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to continuously operate mobility rather than stopping the mobility by detecting a voltage difference between opposite end portions of a first fuse or applied current, determining abnormality of the first fuse based on the detected information, and operating a pyro switch upon determining abnormality of the first fuse to achieve connection with a second fuse to allow current to flow.

In accordance with an aspect of the present invention, the above and other objects may be accomplished by the provision of an emergency power management system of a mobility including a fuse device connected to a battery and including a first circuit and a second circuit in which a first fuse and a second fuse are respectively provided and are connected in parallel, a pyro switch provided between the first circuit and the second circuit, and configured to establish electric connection with the first circuit in ordinary times and to release electric connection with the first circuit and to establish electric connection with the second circuit in a case of emergency, a determiner configured to determine abnormality of the first fuse based on current applied from the battery or voltages at opposite end portions of the first fuse, and a controller configured to operate the pyro switch when abnormality occurs in the first fuse.

The pyro switch may include a first connector connected to the first circuit, a second connector connected to the second circuit, a moving unit which is connected to the first circuit in ordinary times and is moved to be disconnected from the first circuit and to be connected to the second circuit in a case of emergency, an operator electrically connected to the controller and configured to move the moving unit in a case of emergency under control of the controller, and a bus bar unit which is electrically connected to the moving unit and establishes electric connection with the first circuit or the second circuit according to movement of the moving unit.

The pyro switch may include a cylinder unit in which the moving unit is moved and which electrically connects the first connector or the second connector to the moving unit according to a position of the moving unit, and the moving unit is moved by gunpowder explosion of the operator in the cylinder unit.

The system may further include a voltage measurement device electrically connected to the determiner and electrically connected to opposite end portions of the first fuse and configured to measure a difference in voltages between the opposite end portions of the first fuse, wherein the determiner may determine abnormality of the first fuse when the voltage difference measured by the voltage measurement device is equal to or greater than a predetermined reference value.

The system may further include a current measurement device electrically connected to the determiner, and electrically connected to the first circuit and configured to measure a current of the first circuit, wherein the determiner may determine abnormality of the first fuse according to the current measured by the current measurement device.

The system may further include a calculator electrically connected to the current measurement device and configured to determine a deteriorated degree of durability of the first fuse according to the current measured by the current measurement device, wherein the determiner may determine abnormality of the first fuse when the deteriorated degree of durability determined by the calculator is equal to or greater than a preset value.

The determiner may be connected to an external system, and if the determiner cannot perform determining the abnormality of the first fuse when data size received from the current measurement device exceeds a capacity of the calculator, the external system may determine the deteriorated degree of durability, and the determiner may receive the deteriorated degree of durability.

The mobility may be an air mobility, and the high-voltage battery may supply power to a motor of an air mobility propeller through a relay and an inverter, and the controller may operate the pyro switch when abnormality occurs in the first fuse while the air mobility is in flight and may generate a warning signal when abnormality occurs in the first fuse while the air mobility travels.

In accordance with another aspect of the present invention, the above and other objects may be accomplished by the provision of a method of controlling the aforementioned emergency power management system of the mobility, including a determination operation of determining abnormality of the first fuse according to the current applied from the high-voltage battery or the voltages at opposite end portions of the first fuse, and a control operation of controlling an operation of the pyro switch when determining abnormality of the first fuse in the determination operation.

The method may further include a voltage measurement operation of measuring a difference in the voltages at the opposite end portions of the first fuse prior to the determination operation, and a voltage determination operation of determining whether the difference in voltages measured in the voltage measurement operation is equal to or greater than a predetermined reference value, wherein the determination operation may include determining abnormality of the first fuse when determining that the difference in voltages in the voltage measurement operation is equal to or greater than the predetermined reference value.

The method may further include a current measurement operation of measuring applied current of the first fuse, a calculation operation of determining the deteriorated degree of durability of the first fuse according to the current measured in the current measurement operation, and a deteriorated-degree determination operation of determining whether the deteriorated degree of durability determined in the calculation operation is equal to or greater than the preset value, wherein the determination operation may include determining abnormality of the first fuse when determining that the deteriorated degree of durability is equal to or greater than the preset value in the deteriorated-degree determination operation.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
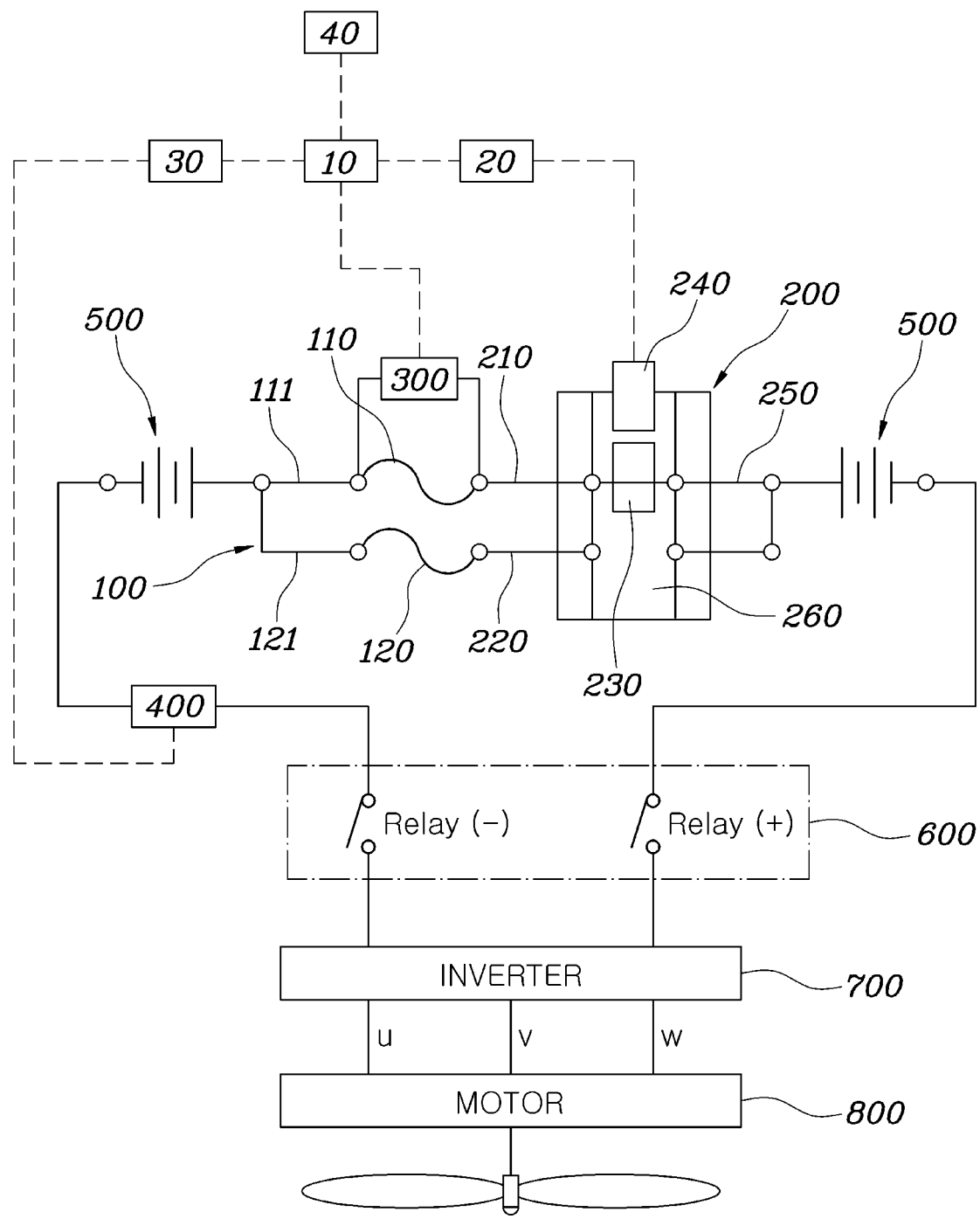
FIG. 1 is a diagram showing the configuration of an emergency power management system of a mobility according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

In exemplary embodiments of the present invention included in the specification, specific structural and functional descriptions are merely illustrated for illustrating embodiments of the present invention and exemplary embodiments of the present invention may be embodied in many forms and are not limited to the exemplary embodiments set forth herein.

Exemplary embodiments of the present invention may be variously changed and embodied in various forms, in which illustrative embodiments of the present invention are shown. However, various exemplary embodiments of the present invention should not be construed as being limited to the exemplary embodiments set forth herein and any changes, equivalents or alternatives which are within the spirit and scope of the present invention should be understood as falling within the scope of the present invention.

It will be understood that although the terms first, second, third etc. may be used herein to describe various elements, these elements should not be limited by these terms. These terms are only used to distinguish one element from another element. For example, a first element may be termed a second element and a second element may be termed a first element without departing from the teachings of the present invention.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements or layers should be interpreted in a like fashion, e.g., "between," versus "directly between," "adjacent," versus "directly adjacent," etc.

The terms used in various exemplary embodiments of the present invention are used for explaining a specific exemplary embodiment of the present invention, not limiting the present invention. Thus, the singular expressions in various exemplary embodiments of the present invention include the plural expressions unless clearly specified otherwise in context. Also, terms such as "include" or "comprise" may be construed to denote a certain characteristic, number, step, operation, constituent element, or combination thereof, but may not be construed to exclude the existence of or possibility of addition of one or more other characteristics, numbers, steps, operations, constituent elements, or combinations thereof.

Unless otherwise defined, all terms including technical and scientific terms used herein have the same meaning as commonly understood by one of ordinary skill in the art to which the present invention pertains. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Reference will now be made in detail to the embodiments, examples of which are illustrated in the accompanying drawings. In the drawings, the same reference numerals in the drawings denote the same element.

According to various exemplary embodiments of the present invention, a determiner 10, a controller 20, and a calculator 30 may be embodied through a non-volatile memory configured to store an algorithm for controlling operations of various components of a vehicle or data of a software command for reproducing the algorithm, and a processor configured to perform operations to be described below using data stored in the corresponding memory. Here, the memory and the processor may be embodied as separate chips, respectively. Alternatively, the memory and the processor may be embodied as a single integrated chip. The processor may be configured in a form of one or more processors.

Figure 2A:
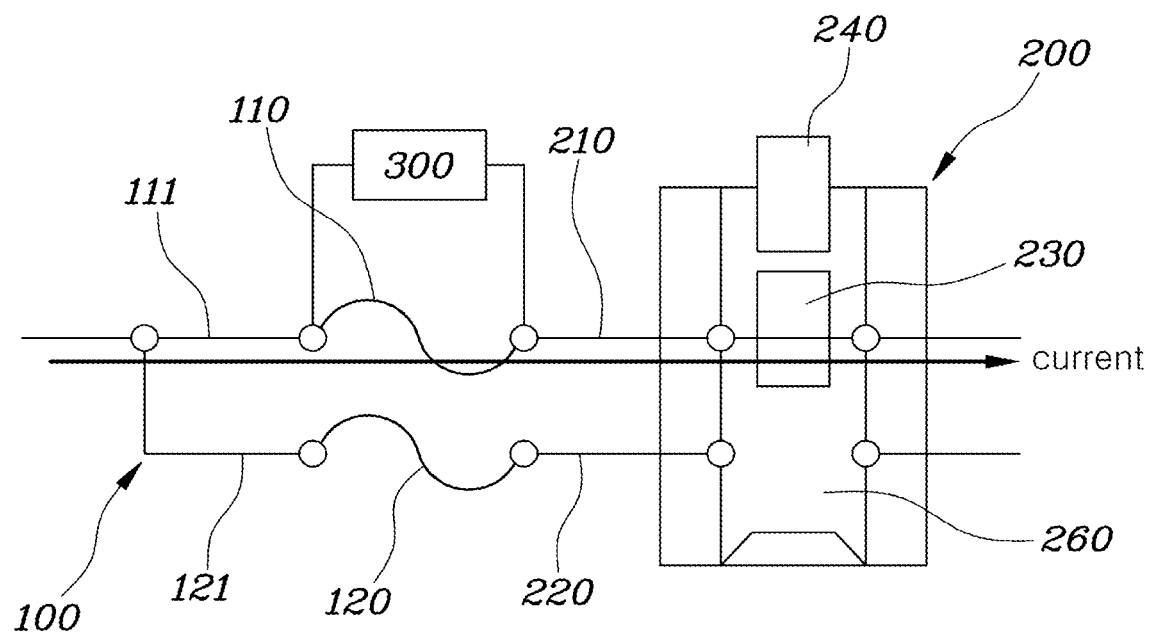
FIG. 2A and FIG. 2B are diagrams showing an operation of a pyro switch of an emergency power management system of a mobility according to various exemplary embodiments of the present invention.
Figure 2B:
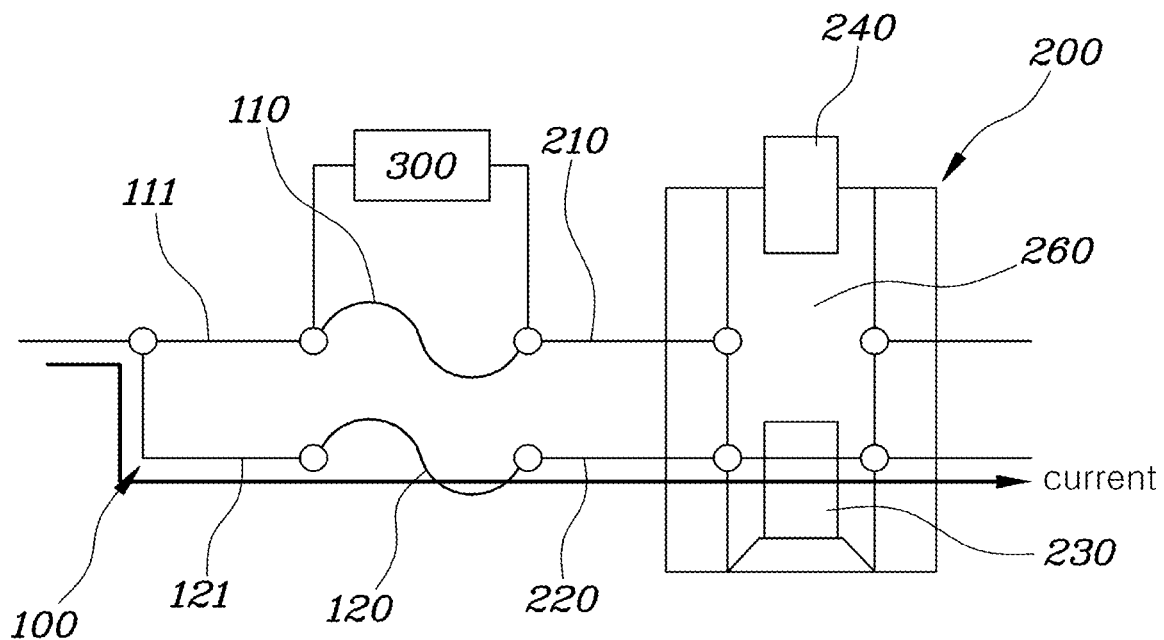
Figure 3:
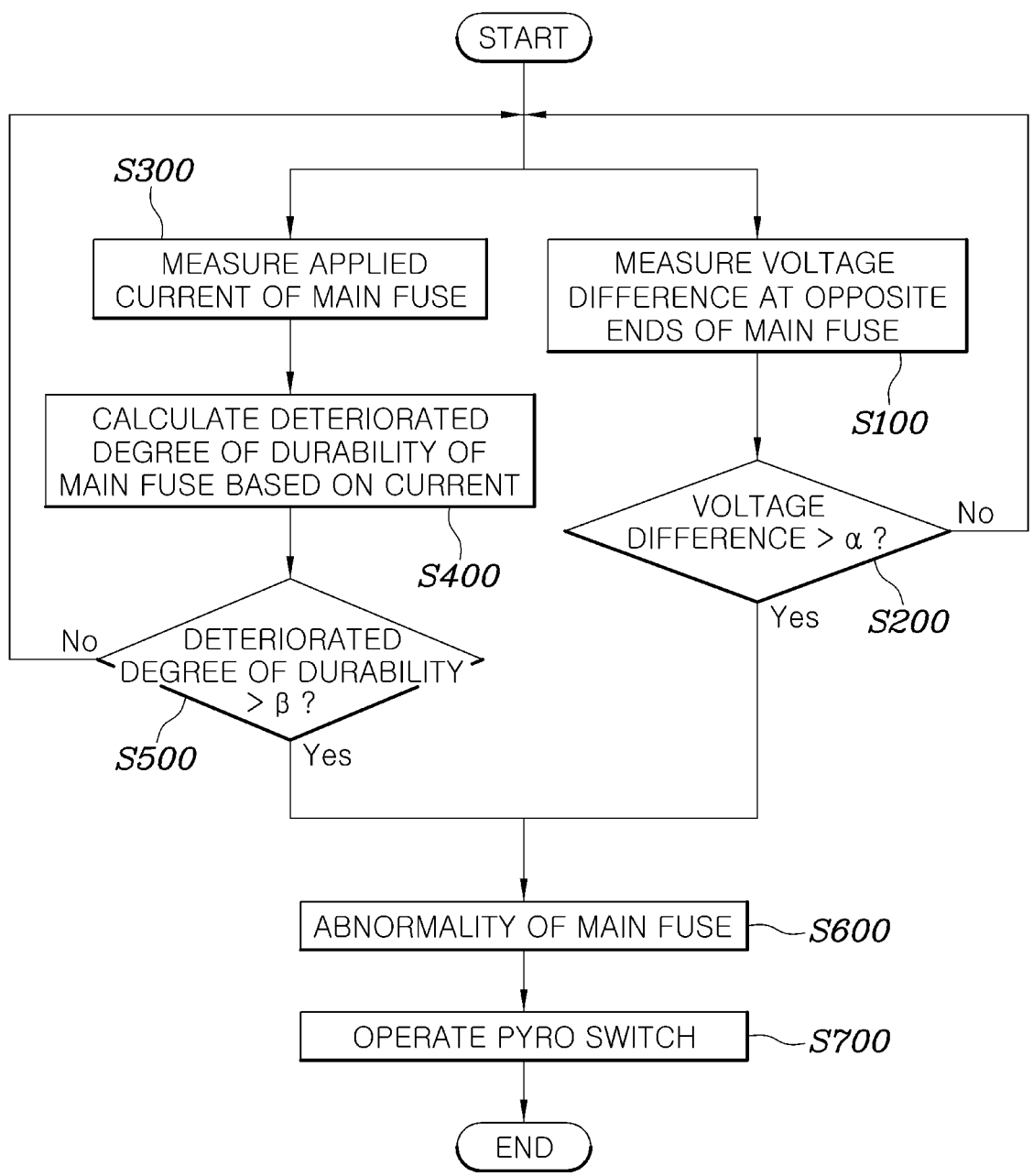
FIG. 3 is a flowchart of a method of controlling an emergency power management system of a mobility according to various exemplary embodiments of the present invention.

FIG. 1 is a diagram showing the configuration of an emergency power management system of a mobility according to various exemplary embodiments of the present invention. FIG. 2A and FIG. 2B are diagrams showing an operation of a pyro switch 200 of an emergency power management system of a mobility according to various exemplary embodiments of the present invention.

With reference to FIGS. 1 to 2B, the emergency power management system of a mobility according to various exemplary embodiments of the present invention will be described below.

The feature of the present invention may be generated by considering the case in which the mobility according to various exemplary embodiments of the present invention is operated by a high-voltage battery 500 and an operation of the mobility is stopped because a main fuse 110 is blown while the mobility is operated.

The emergency power management system of a mobility according to various exemplary embodiments of the present invention may include a fuse device 100 connected to the high-voltage battery 500 and including a main circuit 111 and a sub-circuit 121 in which the main fuse 110 and a sub-fuse 120 are respectively provided and are connected parallel to each other, a pyro switch 200 provided between the main circuit 111 and the sub-circuit 121, and configured to establish connection with the main circuit 111 in ordinary times and to release connection with the main circuit 111 and to establish connection with the sub-circuit 121 in a case of emergency, a determiner 10 configured to determine abnormality of the main fuse 110 based on current applied from the high-voltage battery 500 or a voltage at opposite end portions of the main fuse 110, and a controller 20 configured to operate the pyro switch 200 when abnormality occurs in the main fuse 110.

The fuse device 100 may include the main fuse 110 connected to the main circuit 111 and the sub-fuse 120 connected to the sub-circuit 121, and the main fuse 110 and the sub-fuse 120 may be connected in parallel.

Accordingly, when one of the main fuse 110 and the sub-fuse 120 is blown, current may flow in the other connected one.

According to various exemplary embodiments of the present invention, the main fuse 110 may be connected to the main circuit 111 to transfer power of the high-voltage battery 500 thereto in ordinary times, and current may flow in the sub-fuse 120 in a case of emergency in which the main fuse 110 is blown.

The pyro switch 200 may be connected to the fuse device 100, may be connected to the main fuse 110 to establish connection with the main circuit 111 in ordinary times, and may be connected to the sub-fuse and to establish connection with the sub-circuit 121 in a case of emergency in which the main fuse 110 is blown.

The determiner 10 may detect a difference in voltages detected at opposite end portions of the main fuse 110 to determine whether abnormality of the main fuse 110 occurs or may detect current applied to the main fuse 110 to check the durability of the main fuse 110 and to determine whether abnormality of the main fuse 110 occurs.

When the determiner 10 determines that abnormality of the main fuse 110 occurs, the controller 20 may operate the pyro switch 200 to interrupt connection with the main fuse 110 and to establish connection with the sub-fuse 120 through the sub-circuit 121.

Accordingly, in a case of emergency in which the main fuse 110 is blown, connection with the sub-fuse 120 may be established, and thus the mobility may be operated normally rather than being stopped.

The pyro switch 200 may include a first connector 210 connected to the main circuit 111, a second connector 220 connected to the sub-circuit 121, a moving unit 230 which is connected to the main circuit 111 in ordinary times and is moved to be disconnected from the main circuit 111 and to be connected to the sub-circuit 121 in a case of emergency, an operator 240 configured to move the moving unit 230 in a case of emergency under control of the controller 20, and a bus bar unit 250 which is connected to the moving unit 230 and establishes connection with the main circuit 111 or the sub-circuit 121 according to movement of the moving unit 230. The controller 20 may control the operation of the relay 600.

The pyro switch 200 may be connected to the fuse device 100 through the first connector 210 connected to the main circuit 111 and the second connector 220 connected to the sub-circuit 121.

The moving unit 230 may be connected to the first connector 210 to achieve connection with the main fuse 110 through the main circuit 111 in ordinary times, and may be operated by the operator 240 to release connection with the main fuse 110 and to achieve connection with the sub-fuse 120 and may connect the sub-fuse 120 to the sub-circuit 121 in a case of emergency in which the main fuse 110 is blown.

Accordingly, the mobility may also be operated normally in a case of emergency.

The bus bar unit 250 may achieve connection with the moving unit 230 to allow current to normally flow before or after the moving unit 230 is moved.

The pyro switch 200 may include a cylinder unit 260 in which the moving unit 230 is moved and which connects the first connector 210 or the second connector 220 to the moving unit 230 depending on the position of the moving unit 230, and the moving unit 230 may be moved by gunpowder explosion of the operator 240 in the cylinder unit 260.

The moving unit 230 may be moved by the operator 240, and the moving unit 230 may be moved in the cylinder unit 260 and may be accurately connected to the second connector 220 while being moved. The cylinder unit 260 may completely release connection with the first connector 210 and may be connected to the bus bar unit 250 to connect the moving unit 230 connected to the first connector 210 or the second connector 220 to the main circuit 111 when the moving unit 230 is moved.

The operator 240 may move the moving unit 230 in the cylinder unit 260 by gunpowder explosion, and thereby the moving unit 230 may be rapidly moved in a case of emergency in which the main fuse 110 is blown.

The emergency power management system of a mobility may further include a voltage measurement device 300 connected to opposite end portions of the main fuse 110 and configured to measure a difference in the voltages at the opposite end portions of the main fuse 110, and in the instant case the determiner 10 may determine abnormality of the main fuse 110 when the voltage difference measured by the voltage measurement device 300 is equal to or greater than a predetermined reference value.

The voltage measurement device 300 may be connected to the opposite end portions of the main fuse 110 to measure a voltage, and may detect a voltage difference at the opposite end portions, which occurs when the main fuse 110 is blown.

The voltage measurement device 300 may be connected to the determiner 10, and when detecting the voltage difference at the opposite end portions of the main fuse 110, the voltage measurement device 300 may transfer information on the detected voltage difference to the determiner 10, and thereby the determiner 10 may determine that abnormality occurs in the main fuse 110.

The emergency power management system of a mobility may further include a current measurement device 400 connected to the main circuit 111 and configured to measure current of the main circuit 111, and the determiner 10 may determine abnormality of the main fuse 110 according to the current measured by the current measurement device 400.

The current measurement device 400 connected to the main circuit 111 may measure current applied to the main fuse 110, and as a cumulative value of current applied to the main fuse 110 is increased, the possibility that abnormality occurs in the main fuse 110 may be increased.

The determiner 10 may determine abnormality of the main fuse 110 according to the current measured by the current measurement device 400.

The emergency power management system of a mobility may further include the calculator 30 configured to calculate a deteriorated degree of durability of the main fuse 110 according to the current measured by the current measurement device 400, and the determiner 10 may determine abnormality of the main fuse 110 when the deteriorated degree of durability calculated by the calculator 30 is equal to or greater than a preset value.

The calculator 30 may measure the deteriorated degree of durability of the fuse according to the current measured by the current measurement device 400, and the determiner 10 may determine that abnormality occurs in the main fuse 110 when the deteriorated degree of durability of the fuse calculated by the calculator 30 is equal to or greater than a preset value.

The following equation may represent the lifespan depending on the deteriorated degree of durability of the fuse with respect to applied current.

$$N = e^{61.743 - 10.246 * ln(A)}$$ (N: Lifespan, A: Applied current)

A threshold of a deteriorated degree of a fuse may be determined through evaluation of whether blowing occurs when current is applied to the fuse in an actual vehicle driving pattern and may have different values for respective fuse capacities and manufacturers.

The determiner 10 may be connected to an external system 40, and when it is not possible to perform calculation because data size exceeds the capacity of the calculator 30, the external system 40 may determine the deteriorated degree of durability, and the determiner 10 may receive the result.

When the calculator 30 calculates the deteriorated degree of durability, if it is not possible to perform calculation because data size exceeds the capacity of the calculator 30, data measured by the current measurement device 400 may be transmitted to the external system 40 through telematics, and the external system 40 may determine the deteriorated degree of durability, and the determiner 10 may receive the result.

Accordingly, even if the calculator 30 is not normally operated, the determiner 10 may determine abnormality of the fuse based on the deteriorated degree of durability.

The mobility may be an air mobility, and the high-voltage battery 500 may supply power to a motor 800 of an air mobility propeller through a relay 600 and an inverter 700, and the controller 20 may operate the pyro switch 200 when abnormality occurs in the main fuse 110 while the air mobility is in flight and may generate a warning signal when abnormality occurs in the main fuse 110 while the air mobility travels.

As shown in FIG. 1, the mobility according to various exemplary embodiments of the present invention may be an air mobility in which a propeller is operated, and the controller 20 may control an operation of the pyro switch 200 when abnormality occurs in the main fuse 110 only while the air mobility is in flight and may generate only a warning signal when abnormality occurs in the main fuse 110 while the air mobility travels on the ground.

Accordingly, when the air mobility travels on the ground, if abnormality occurs in the main fuse 110, the main fuse 110 may be immediately replaced, and the pyro switch 200 and the sub-fuse 120 may not be used, reducing manufacturing costs.

A method of controlling the aforementioned emergency power management system of the mobility may include a determination operation S600 of determining abnormality of the main fuse 110 based on the current applied from the high-voltage battery 500 or the voltage at opposite end portions of the main fuse 110, and a control operation S700 of controlling an operation of the pyro switch 200 when determining abnormality of the main fuse 110 in the determination operation.

The method may further include a voltage measurement operation S100 of measuring a difference in the voltages at the opposite end portions of the main fuse 110 prior to the determination operation, and a voltage determination operation S200 of determining whether the difference in voltages measured in the voltage measurement operation S100 is equal to or greater than a predetermined reference value, and in the instant case the determination operation S600 may include determining abnormality of the main fuse 110 when determining that the difference in voltages in the voltage measurement operation S200 is equal to or greater than the predetermined reference value.

The method may further include a current measurement operation S300 of measuring applied current of the main fuse 110, a calculation operation S400 of calculating the deteriorated degree of durability of the main fuse 110 based on the current measured in the current measurement operation S300, and a deteriorated-degree determination operation S500 of determining whether the deteriorated degree of durability measured in the calculation operation is equal to or greater than the preset value, and in the instant case the determination operation S600 may include determining abnormality of the main fuse 110 when determining that the difference in voltages is equal to or greater than the predetermined reference value in the deteriorated-degree determination operation S500.

The emergency power management system of a mobility according to various exemplary embodiments of the present invention may measure a voltage at opposite end portions of the main fuse to monitor whether the main fuse is blown, may measure current applied to the main fuse to calculate a deteriorated degree of durability of the main fuse, may determine abnormality of the main fuse based on whether the main fuse is blown or the deteriorated degree of durability of the main fuse, may operate the pyro switch to achieve connection with the sub-fuse, and may continuously operate the mobility rather than stopping the mobility.

Furthermore, when data size exceeds the capacity of the calculator for calculating a deteriorated degree of durability of the main fuse, current measurement data may be transmitted to an external system, the external system may determine the deteriorated degree of durability, and the determiner may receive the result, accurately calculating the deteriorated degree of durability.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An emergency power management system of a mobility, the system comprising:
   a fuse device connected to a battery and including a first circuit and a second circuit in which a first fuse and a second fuse are respectively provided and are electrically connected in parallel to each other;
   a pyro switch provided between the first circuit and the second circuit, and configured to establish electric connection with the first circuit in a first condition, or to release electric connection with the first circuit and to establish electric connection with the second circuit in a second condition;
   a determiner configured to determine abnormality of the first fuse according to a current applied from the battery or voltages at opposite end portions of the first fuse; and
   a controller configured to operate the pyro switch when abnormality occurs in the first fuse.

2. The system of claim 1,
   wherein the first condition is a case in which the first fuse is not blown, and
   wherein the second condition is a case in which the first fuse is blown.

3. The system of claim 1, wherein the pyro switch includes:
   a first connector connected to the first circuit;
   a second connector connected to the second circuit;
   a moving unit which is connected to the first circuit in the first condition, and is moved to be disconnected from the first circuit and to be connected to the second circuit in the second condition;
   an operator electrically connected to the controller and configured to move the moving unit in the second condition under control of the controller; and
   a bus bar unit which is electrically connected to the moving unit and establishes electric connection with the first circuit or the second circuit according to movement of the moving unit.

4. The system of claim 3,
   wherein the pyro switch includes a cylinder unit in which the moving unit is moved and which electrically connects the first connector or the second connector to the moving unit according to a position of the moving unit.

5. The system of claim 4, wherein the moving unit is moved by gunpowder explosion of the operator in the cylinder unit.

6. The system of claim 1, further including:
   a voltage measurement device electrically connected to the determiner, and electrically connected to opposite end portions of the first fuse and configured to measure a difference in voltages between the opposite end portions of the first fuse,
   wherein the determiner is configured to conclude the first fuse in the abnormality upon determining that the voltage difference measured by the voltage measurement device is equal to or greater than a predetermined reference value.

7. The system of claim 1, further including:
   a current measurement device electrically connected to the determiner, and electrically connected to the first circuit and configured to measure a current of the first circuit,
   wherein the determiner is configured to determine the abnormality of the first fuse according to the current measured by the current measurement device.

8. The system of claim 7, further including:
   a calculator electrically connected to the current measurement device and configured to determine a deteriorated degree of durability of the first fuse according to the current measured by the current measurement device,
   wherein the determiner electrically connected to the calculator is configured to conclude that the first fuse is in the abnormality upon determining that the deteriorated degree of durability determined by the calculator is equal to or greater than a predetermined value.

9. The system of claim 7, wherein the determiner is connected to an external system, and if the determiner cannot perform determining the abnormality of the first fuse when data size received from the current measurement device exceeds a capacity of the calculator, the external system is configured to determine the deteriorated degree of durability, and the determiner receives the deteriorated degree of durability from the external system.

10. The system of claim 1,
    wherein the controller is configured to operate the pyro switch when the abnormality occurs in the first fuse while the air mobility is in flight and generates a warning signal when the abnormality occurs in the first fuse while the air mobility travels.

11. The system of claim 1,
wherein the mobility is an air mobility, and the battery supplies power to a motor of an air mobility propeller through a relay and an inverter.

12. A method of controlling the emergency power management system of claim 1, the method comprising:
   determining, by the determiner, the abnormality of the first fuse according to the current applied from the battery or the voltages at the opposite end portions of the first fuse; and
   controlling, by the controller, an operation of the pyro switch when determining the abnormality of the first fuse.

13. The method of claim 12, further including:
   measuring a difference in the voltages at the opposite end portions of the first fuse prior to the determining the abnormality of the first fuse based on the current; and
   determining, by the determiner, whether the difference in the voltages is equal to or greater than a predetermined reference value to conclude whether the first fuse is in the abnormality,
   wherein the determining the abnormality of the first fuse includes concluding that the first fuse is in the abnormality upon determining that the difference in the voltages is equal to or greater than the predetermined reference value.

14. The method of claim 12, further including:

measuring the current of the first fuse;

determining a deteriorated degree of durability of the first fuse according to the measured current; and determining whether the deteriorated degree of durability determined in the determining the deteriorated degree of durability of the first fuse according to the measured current is equal to or greater than a predetermined value, wherein the determining the abnormality of the first fuse includes concluding that the first fuse is in the abnormality upon determining that the deteriorated degree of durability is equal to or greater than the predetermined value.

\* \* \* \* \*